United States Patent [19]
Daly et al.

[11] Patent Number: 5,337,333
[45] Date of Patent: Aug. 9, 1994

[54] LASER BEAM PULSE FORMATTING METHOD

[75] Inventors: Thomas P. Daly; Edward I. Moses; Ralph W. Patterson, all of Livermore; Richard H. Sawicki, Danville, all of Calif.

[73] Assignee: The United States of America as represented by the United States Department of Energy, Washington, D.C.

[21] Appl. No.: 973,878

[22] Filed: Nov. 10, 1992

[51] Int. Cl.⁵ .............................. H01S 3/083
[52] U.S. Cl. ........................ 372/94; 372/700
[58] Field of Search ..................... 372/94, 700

[56] References Cited

U.S. PATENT DOCUMENTS

| | | | |
|---|---|---|---|
| 4,390,247 | 6/1983 | Freyre | 372/700 |
| 4,468,776 | 8/1984 | McLellan | 372/700 |
| 4,486,887 | 12/1984 | Hoag et al. | 372/700 |
| 5,027,360 | 6/1991 | Nabors et al. | 372/94 |
| 5,075,893 | 12/1991 | Epstein et al. | 372/94 |
| 5,099,486 | 3/1992 | Acharekar et al. | 372/94 |

FOREIGN PATENT DOCUMENTS

0133788  6/1987  Japan ..................... 372/700

*Primary Examiner*—John D. Lee
*Assistant Examiner*—Robert E. Wise
*Attorney, Agent, or Firm*—Isabelle R. McAndrews; Roger S. Gaither; William R. Moser

[57] ABSTRACT

A method for formatting a laser beam pulse (20) using one or more delay loops (10). The delay loops (10) have a partially reflective beam splitter (12) and a plurality of highly reflective mirrors (14) arranged such that the laser beam pulse (20) enters into the delay loop (10) through the beam splitter (12) and circulates therein along a delay loop length (24) defined by the mirrors (14). As the laser beam pulse (20) circulates within the delay loop (10) a portion thereof is emitted upon each completed circuit when the laser beam pulse (20) strikes the beam splitter (12). The laser beam pulse (20) is thereby formatted into a plurality of sub-pulses (50, 52, 54 and 56). The delay loops (10) are used in combination to produce complex waveforms by combining the sub-pulses (50, 52, 54 and 56) using additive waveform synthesis.

18 Claims, 5 Drawing Sheets

LASER BEAM PULSE FORMATTING METHOD

BACKGROUND OF THE INVENTION

The invention described herein arose in the course of, or under, contract No. W-7405-ENG-48 and contract No. DE-AC05-840R21400 awarded by the U.S. Department of Energy.

The present invention relates generally to lasers, and more particularly to an improved method for formatting the output of pulse lasers.

New applications for laser technology are being developed at a prodigious rate. Some of the applications require the formatting of the laser output to meet specific wave shape and/or pulse duration requirements. There are many applications in which it is useful to stretch and temporarily format the pulse shape of a pulsed laser beam. One such application is in the field of X-Ray lithography. Pulse formatting techniques that can endure the thermal loading of a high average power laser beam are especially useful.

It is well known that the pulse duration of pulse laser devices may be modulated by a number of well know internal means. However, the characteristics of laser pulses often are controlled externally, rather than by modulating laser excitation, or the like. Conceptually, the simplest modulation is by blocking the beam at some times, which can be done in various ways. Of course, mechanical block means is limited to relatively low frequency modulation of the pulse. Further, it is frequently desirable to extend the duration of a laser pulse beyond the practical limits which may be accomplished by means of manipulation of the parameters of laser modulation. It may also be desirable to modulate a laser pulse into divisional units other than simple pulses, such as a complex wave shape.

An additional problem is posed when the laser pulse to be modulated is of a high average power level. In such instances, considerable heat may be created, and many, otherwise viable, means for modulating pulse beams are unable to withstand the thermal loading of such an application.

No prior art laser pulse modulation device, to the inventors' knowledge, can successfully extend the overall duration of a succession of high power laser pulses while modulating them into divisional pulses of a controlled duration. All previous means for modulating laser pulses have either, been incapable of very high frequency modulation, or else have been unable to withstand the abuses of high power laser pulse modulation, or else have not extended the overall duration of a pulse significantly, or else have not modulated a pulse according to a specified time constant into a controlled waveshape.

SUMMARY OF THE INVENTION

Accordingly, it is an object of the present invention to provide a method and means for extending the overall duration of a laser pulse.

It is another object of the present invention to provide a method and means for modulating a laser pulse according to specific time parameters.

It is still another object of the present invention to provide a method and means for modulating a laser pulse into a series of divisional complex waves.

It is yet another object of the present invention to provide a method and means for modulating and extending a laser beam pulse which can withstand usage with high power lasers.

It is still another object of the present invention to provide a method and means for modulating a laser pulse which is reliable in operation.

It is yet another object of the present invention to provide a method and means for controlling the waveshape and duration of a laser pulse.

Briefly, the preferred embodiment of the present invention is an array of time delay loops, with each loop in the array consisting of a partially reflecting beam splitter and a plurality of highly reflective mirrors. The mirrors of each loop are arranged so as to accept a pulse introduced through the beam splitter and to cycle the pulse within the loop with each cycle being of a duration determined by the total length of the loop. At the end of each cycle, a portion of the pulse is emitted from the loop through the partially reflecting beam splitter, forming a divisional wave portion within the pulse. A plurality of loops, each having either similar or different time constants, can be arranged so as to modulate the laser pulse into complex wave shape pulse portions using additive waveform synthesis.

An advantage of the present invention is that a laser pulse may be extended in overall duration.

A further advantage of the present invention is that a laser pulse may be modulated at high frequency.

Yet another advantage of the present invention is that a laser pulse may be modulated according to set time parameters.

Still another advantage of the present invention is that complex wave shapes can be produced.

Yet another advantage of the present invention is that high power laser pulses can be modulated.

These and other objects and advantages of the present invention will become clear to those skilled in the art in view of the description of the best presently known mode of carrying out the invention and the industrial applicability of the preferred embodiment, as described herein and as illustrated in the several figures of the drawing.

DETAILED DESCRIPTION OF THE INVENTION

Figure 1:
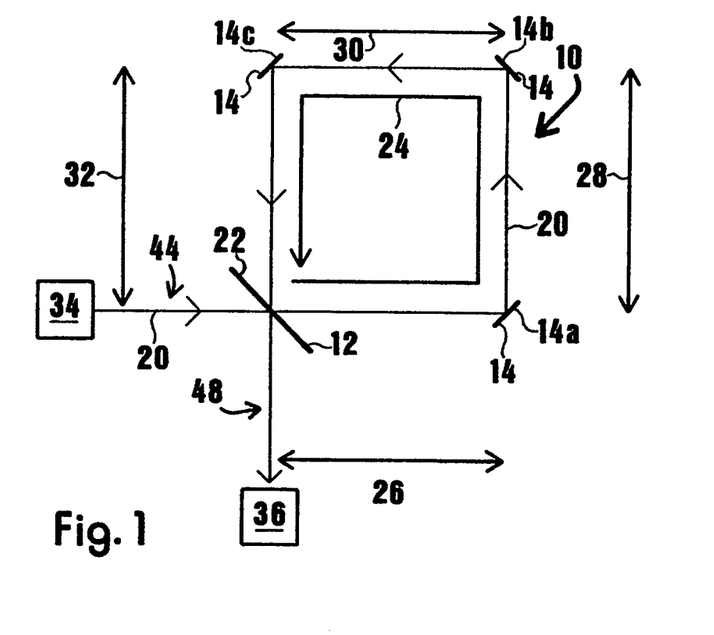
FIG. 1 is a schematic representation of a delay loop, according to the present invention.

The best presently known mode for carrying out the invention is a combination of time delay loops for modifying laser pulses according to the inventive method. The predominant expected usage of the inventive laser beam pulse formatting method is in modifying high power laser beam pulses for scientific and industrial applications. A delay loop 10, as used to accomplish the present inventive method, is illustrated in the diagram of FIG. 1, and is designated therein by the general reference character 10. The delay loop 10 has a partially reflective beam splitter 12 and a plurality (three, in the present example) of highly reflective mirrors 14. The best presently known embodiment 10 of the present invention has a first highly reflective mirror 14a, a second highly reflective mirror 14b and a third highly reflective mirror 14c arranged such that a laser beam pulse 20 enters and exits the delay loop 10 through the beam splitter 12, as is depicted in FIG. 1. It should be noted that, in the view of FIG. 1, the laser beam pulse 20 is depicted as a line which defines the entire path of the laser beam pulse 20 as the laser beam pulse 20 traverses the inventive delay loop 10. One skilled in the art will recognize that, in practice, and at any particular point in time, the laser beam pulse may, or may not, be found instantaneously along the entire length of the path shown in FIG. 1 as the laser beam pulse 20. The actual length of the laser beam pulse 20 in relation to the depiction thereof in FIG. 1 will vary according to the duration of the pulse, and the size of the delay loop 10, which will be discussed in more detail, hereinafter.

The beam splitter 12 is a known optical element which has a mirrored side 22 that is, intentionally, imperfectly reflective, such that the laser beam pulse 20, upon striking the mirrored side 22 of the beam splitter 12 will, in part, pass therethrough and, in part, be reflected therefrom. In the best presently known embodiment 10 of the present invention the mirrored side 22 of the beam splitter 12 faces generally toward the second highly reflective mirror 14b, as is depicted in the view of FIG. 1, although this is not necessary to the practice of the invention.

A variable regarding the mirrored side 22 of the beam splitter 12 is that the mirrored surface 22 is treated, using known methods, such that the proportion of the laser beam pulse 20 which is passed therethrough is controlled, as compared to that portion of the laser beam pulse 20 which is reflected therefrom. In the best presently known embodiment 10 of the present invention, the mirrored surface 22 passes therethrough approximately one half of the laser beam pulse 20, although it is within the scope of the invention that this might be varied according to the needs of the particular application.

One skilled in the art will recognize that the distance between the highly reflective mirrors 14a, 14b and 14c of the delay loop 10 will be the prime factor in determining an amount of time ("τ") in which the laser beam pulse 20 makes an entire circuit within the delay loop 10 from the beam splitter 12, to the first highly reflective mirror, 14a, to the second highly reflective mirror 14b, to the third highly reflective mirror 14c and then returning to the beam splitter 12. Thus, two primary variables which may be controlled in the manufacture of a particular iteration of the delay loop 10 are the reflectivity ("R") of the beam splitter 12 (as previously discussed, herein) and a delay loop length 24 which, in the case of the best presently known embodiment 10 of the present invention, is the sum of the lengths of a first delay loop leg 26, a second delay loop leg 28, a third delay loop leg 30 and a fourth delay loop leg 32. As can be seen in the view of FIG. 1, the first delay loop leg 26 spans the distance between the beam splitter 12 and the first highly reflective mirror 14a, the second delay loop leg 28 spans the distance between the first highly reflective mirror 14a and the second highly reflective mirror 14b, the third delay loop leg 30 spans the distance between the second high reflective mirror 14b and the third highly reflective mirror 14c and the fourth delay loop leg spans the distance between the third highly reflective mirror 14c and the beam splitter 12.

In the example of FIG. 1, the single delay loop 10 is illustrated with the laser beam pulse 20 being emitted initially from a laser source 34, and further with the laser beam pulse 20 being directed into a laser beam detection device 36 as it exits the delay loop 10. In practice, the inventive delay loop is actually used in more complex configurations, as will be described in greater detail, hereinafter.

As can be seen in the view of FIG. 1, the delay loop 10 illustrated herein is generally rectangular in shape, with corners being formed by the beam splitter 12, the first highly reflective mirror 14a, the second highly reflective mirror 14b and the third highly reflective mirror 14c. It should be noted that delay loops of other configurations (not shown) could be constructed using different quantities of highly reflective mirrors 14. For example a triangular delay loop (not shown) could be constructed using three such highly reflective mirrors 14, with proper adjustment of relative angles of the various components of the delay loop 10 and proper positioning of the delay loop 10 in relation to the laser source 34 and the laser beam detection device 36. Indeed, in some applications, such alternative configurations of the inventive delay loop 10 might be preferable.

Now beginning a discussion of the unique properties derived from the configuration of the inventive delay loop 10, it is recognized that causing the laser beam pulse 20 to be delayed by causing it to travel some additional distance between the laser source 34 and the laser beam detection device 36 is not unique to the present invention. However, the inventive delay loop 10 differs in that the unique arrangement of components provides for elongation and/or wave form modification of the laser beam pulse 20, in addition to any desired delay. After the laser beam pulse 20 is admitted into the delay loop 10 through the beam splitter 12 it circulates therein and, with each complete circuit within the delay loop 10, a portion of the laser beam pulse 20 is emitted from the delay loop 10 through the partially reflective beam splitter 12 while the remainder of the laser beam pulse 20 continues to circulate within the delay loop 10. Given the specific construction of the best presently known embodiment 10 of the present invention, as previously discussed herein, approximately one half of any remaining amount of the laser beam pulse 20 that strikes the mirrored side 22 of the beam splitter 12 will pass therethrough, and one half will be reflected therefrom to recirculate within the delay loop 10.

Figure 2:
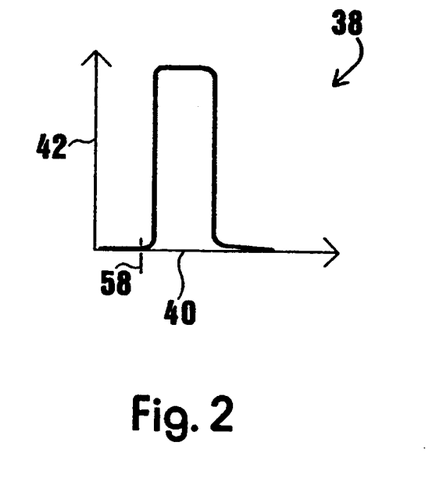
FIG. 2 is a trace diagram representing a typical laser beam pulse waveform.
Figure 3:
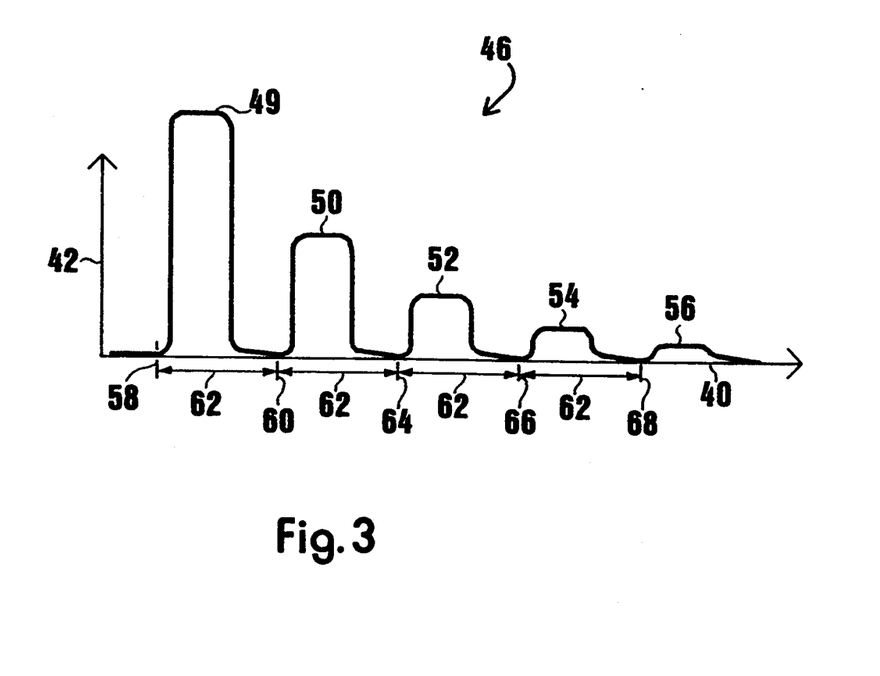
FIG. 3 is a trace diagram representing the laser pulse waveform of FIG. 2, as modified according to the present inventive method.

FIG. 2 is a trace diagram representing a typical initial laser beam pulse waveform 38 with deviation along an "X" axis 40 representing time and deviation along a "Y" axis 42 representing instantaneous intensity of the laser beam pulse 20 (FIG. 1). The initial laser beam pulse waveform 38 is the intensity/time plot of an initial portion 44 (FIG. 1) of the laser beam pulse 20, as the laser beam pulse 20 exits the laser source 34 and enters the delay loop 10. Given the example of the initial laser beam pulse waveform 38 of FIG. 2 and the best presently known embodiment 10 of the present invention disclosed in relation to FIG. 1, a resultant stretched waveform 46 is shown in FIG. 3. (While none of the figures of the drawing are drawn to scale, in order to avoid any possible confusion it should be emphasized that, in order to illustrate the necessary detail, the comparative scale of FIG. 3 is intentionally different from that of FIG. 2, the relative intensities being explained in this text.) The stretched waveform 46 is the intensity/time plot of an exit portion 48 (FIG. 1) of the laser beam pulse 20, as the laser beam pulse 20 exits the delay loop 10, with time and beam intensity plotted along the X axis 40 and the Y axis 42, respectively.

A "now" pulse 49, a first sub-pulse 50, a second sub-pulse 52, a third sub-pulse 54 and a fourth sub-pulse 56 are distributed in time along the X axis 40 of the plot of FIG. 3. A first time reference mark 58 indicates the time at which the initial laser beam pulse waveform 38 (FIG. 2) begins, and the "now" pulse 49, which is that portion of the initial pulse 38 which is reflected from the beam splitter 12 (FIG. 1) and which, therefore, does not enter the delay loop 10 (FIG. 1), is essentially concurrent in time (for these practical purposes). A second time reference mark 60 represents the time at which the first sub-pulse 50 begins. The span between the first time reference mark 58 and the second time reference mark 60 represents a time factor ("$\tau$") 62 which is the time in which the laser beam pulse 20 travels the delay loop length 24 (FIG. 1) within the delay loop 10. A third time reference mark 64, a fourth time reference mark 66 and a fifth time reference mark 66 represent the origins of the second sub-pulse 52, the third sub-pulse 54 and the fourth sub-pulse 56, respectively. Each of the time reference marks 58, 60, 64 66 and 68 is separated from adjacent such time reference marks 58, 60 64, 66 and 68 by the time factor 62.

Referring again to FIG. 1, as can be understood in light of the previous description of the best presently known embodiment 10 of the present invention, when the laser beam pulse 20 enters the delay loop 10 through the beam splitter 12 it circulates therein. Since, as previously described, the mirrored surface 22 of the best presently known embodiment 10 of the present invention is constructed so as to allow approximately one half of the laser light which strikes it to pass therethrough, when the laser beam pulse 20 first strikes the mirrored surface 22 of the beam splitter 12 from within the delay loop 10, the first sub-pulse pulse 50 (FIG. 3) is emitted from the delay loop 10 through the beam splitter 12, with the first sub-pulse 50 being of approximately one half the intensity of the initial laser beam pulse waveform 38. Thereafter, the portion of the laser beam pulse 20 remaining within the delay loop 10 and the second sub-pulse 52 is emitted when the remaining portion of the laser beam pulse 20 strikes the beam splitter 12. This cycle is repeated creating, in turn, the third sub-pulse 54 and the fourth sub-pulse 56. One skilled in the art will recognize that this cycle will continue past the creation of the fourth sub-pulse 56, and in some applications additional sub-pulses (not shown) of significant intensity will be created.

Figure 4:
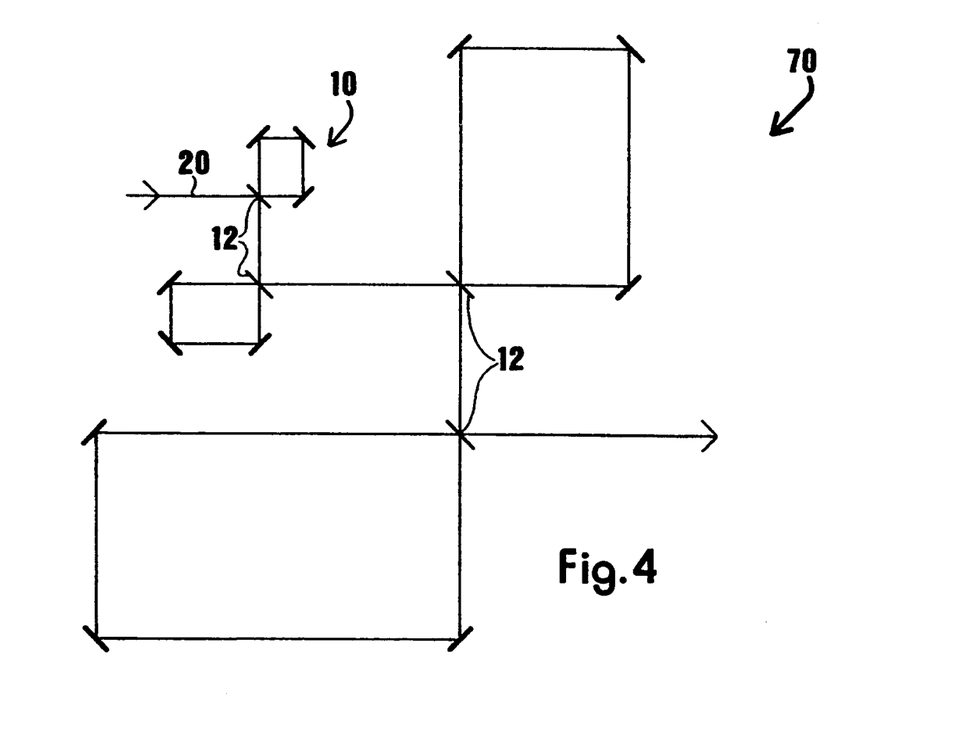
FIG. 4 is an example of a complex array of the inventive delay loops.
Figure 5:
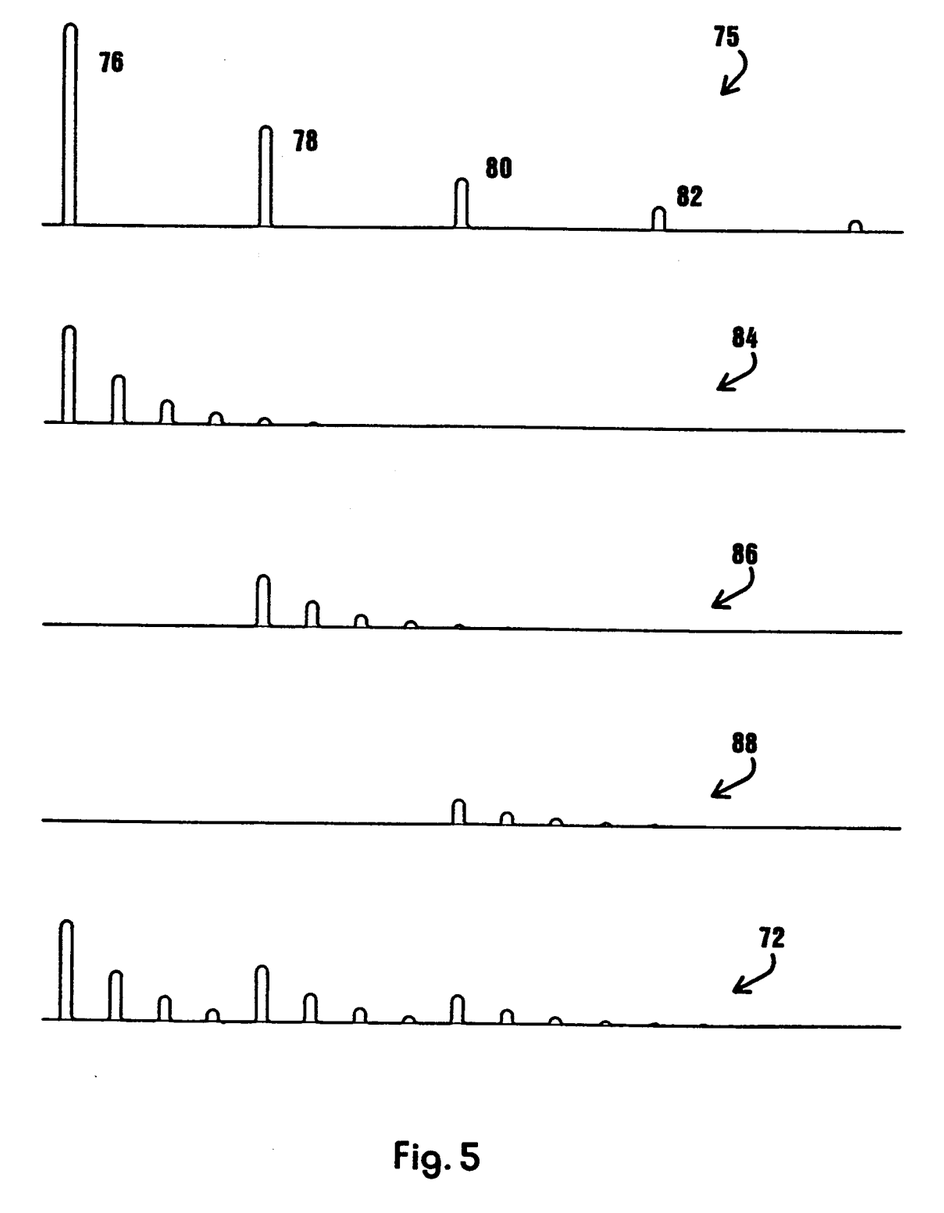
FIG. 5 is a trace diagram illustrating a simple additive waveform synthesis , according to the present method.
Figure 6:
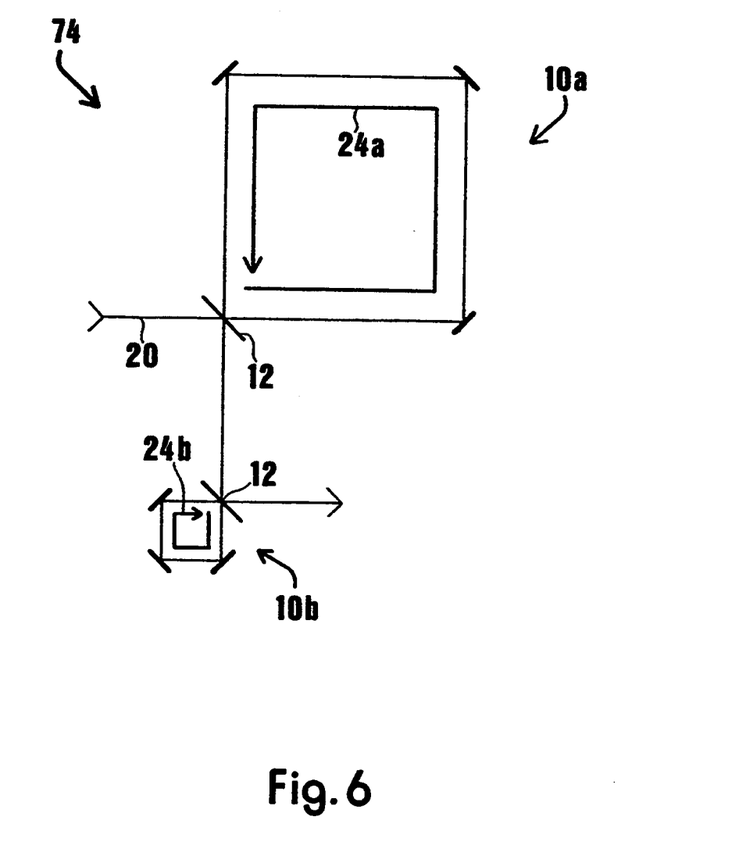
FIG. 6 is a complex array of the inventive display loops for producing the complex waveform of FIG. 5.

Thus far, the effects of the delay loop 10, according to the present invention, have been discussed in terms of the effects of the example of the best presently known embodiment 10 of the present invention, standing alone. However, the inventors have found that the greatest utility is derived from using combinations of the delay loops 10 to produce more complex wave forms. FIG. 4 is an example of a first complex array 70 of four delay loops 10. In the example of FIG. 4, each of the delay loops 10 is of a different size, and thus has a different delay loop length 24 (FIG. 1). In addition, although it cannot be seen in the view of FIG. 4, the mirrored surfaces 22 (FIG. 1) of the beam splitters 12 of each of the delay loops 10 may be constructed so as to be either more or less reflective than that described in relation to the mirrored surface 22 (FIG. 1) of the beam splitter 12 of the best presently known embodiment 10 of the present invention. One skilled in the art will recognize that, by varying the delay loop length 24 and the reflectivity of the mirror surface 22 of the beam splitter 12, a great variety of sub-pulses 50, 52, 54 and 56 can be created, varying in both relative intensity and time factor 62. Furthermore, when, as in the example of FIG. 4, the various delay loops 10 are combined to produce the varied sub-pulses 50, 52, 54 and 56 (FIG. 3), the sub-pulses 50, 52, 54 and 56 will be combined. Such combination adheres to the known principles of additive waveform synthesis, which principles have formerly been applied to electromagnetic wave forms. One familiar with additive waveform synthesis principles will recognize that, although there is similarity between the additive waveform synthesis of electromagnetic waves and this application of the present inventive method, the waveforms created by the present inventive method will differ substantially from those common to electromagnetic wave applications. An example illustrating the creation of a complex wave form 72 is shown in FIG. 5 and FIG. 6. FIG. 6 is a second complex array 74 of the inventive delay loops 10. In the example of FIG. 6, there are two delay loops 10 with a first delay loop 10a having a first delay loop length 24a four times as long as a second delay loop length 24b of a second delay loop 10b. Referring now to FIG. 5, an intermediate wave form 75 is produced by the first delay loop 10a (FIG. 6) and emitted toward the second delay loop 10b, according to the method discussed previously, herein, in relation to FIG. 1. The intermediate waveform 75 has a first intermediate pulse 76, a second intermediate pulse 78, a third intermediate pulse 80 and a fourth intermediate pulse 82. According to the methods previously discussed, herein, a first secondary waveform 84 is produced by the second delay loop 10b (FIG. 6) given an input of the first intermediate pulse 76 Similarly, the second intermediate pulse 78 produces a second secondary waveform 86 within the second delay loop 10b, and the third intermediate pulse 80 produces a third secondary waveform 88 within the second delay loop 10b. For the purposes of the present example, no secondary waveforms are shown resulting from the fourth intermediate pulse 82, since such would be of relatively insignificant magnitude, anyway. Given the above, one familiar with the principles of additive waveform synthesis will recognize that the secondary waveforms 84, 86 and 88 are summed to form the complex wave form 72.

It should be recognized that, in order to best illustrate the principles involved, the simplified example of FIGS. 3 and 4 is provided. For instance, the example uses a first delay loop length 24a which is an exact multiple of the second delay loop length 24b, such that each of the secondary waveforms 84, 86 and 88 is perfectly in phase with the others. One skilled in the art will recognize that, were this not the case, the resultant complex wave form 72 would be much more irregular in shape than is shown in the present example of FIG. 5.

Figure 7:
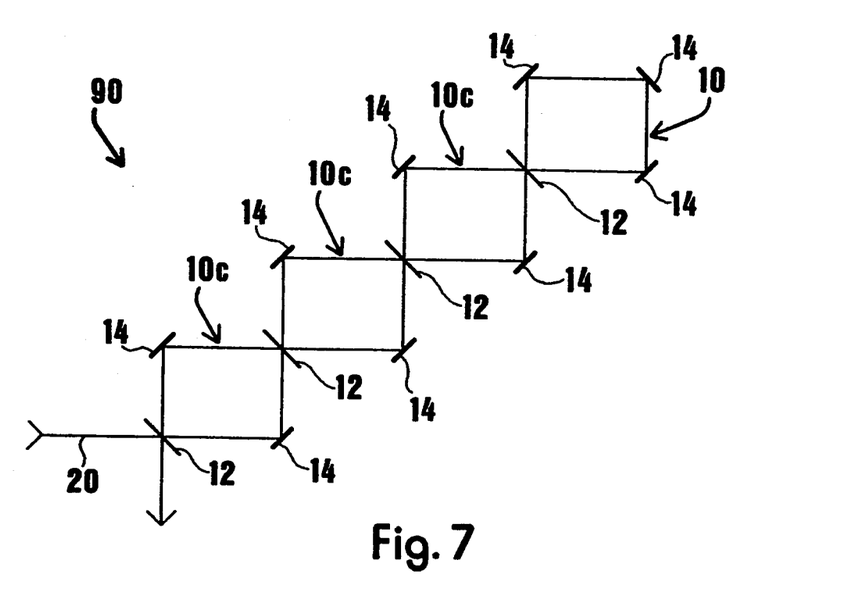
FIG. 7 is an alternative complex array of the inventive display loops.

As previously stated, the delay loops 10 may be configured in multiples, according to the needs of a particular application, to produce a great variety of complex wave forms 72. FIG. 7 is a third complex array 90 which illustrates yet another variation of the application of the inventive method. The third complex array 90 utilizes one of the delay loop 10 and three of a modified delay loop 10c. As can be seen in the view of FIG. 7, the delay loop 10 has a beam splitter 12 and three mirrors 14. However, the modified delay loops 10c have only two mirrors 14 and two beam splitters 12, with the additional one of the beam splitters 12 in each of the modified delay loops 10c being placed at the intersection of the modified delay loop 10c and either another of the modified delay loops 10c or the delay loop 10, with such beam splitters 12 being common to the modified delay loops 10c and/or modified delay loop 10c and delay loop 10 thus adjoined. As can also be seen in the view of FIG. 7, the beam splitters 12 are diagonally opposed from each other across the modified delay loops 10c. This variation allows a "delay loop within a delay loop" method for further modifying the complex wave form 72 (FIG. 5).

Figure 8:
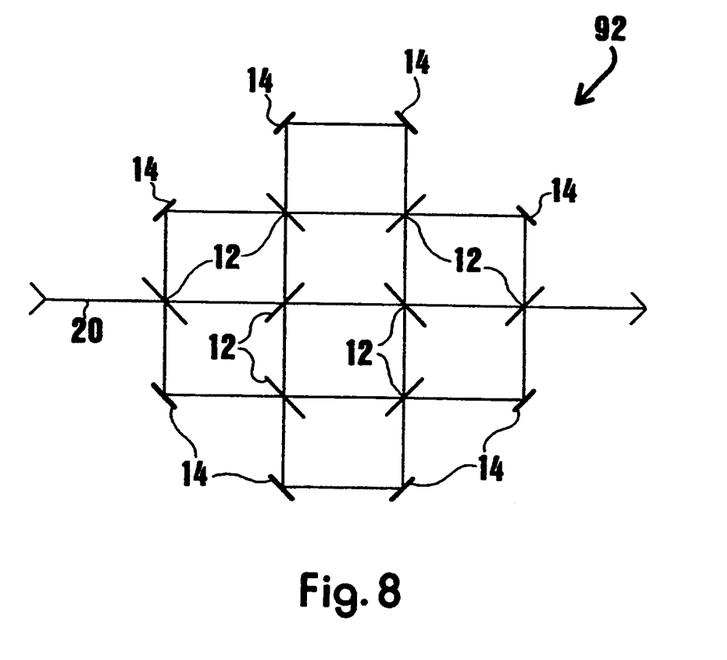
FIG. 8 is yet another alternative complex array of the inventive display loops.

A fourth complex array 74 is illustrated in FIG. 8 as yet another example of an application of the present inventive method. The fourth complex array 74 has eight beam splitters 12 and eight mirrors 14 arranged to produce a highly modified version of the complex wave form 72 (FIG. 5).

Various modifications may be made to the invention without altering its value or scope. For example, the delay loops 10 may be of varying shapes and sizes, as previously discussed herein. Also, the delay loops 10 may be arranged in a near infinite variety of ways and they may be modified by substituting beam splitters 12 for any and/or all of the mirrors 14, provided that means is provided for directing the laser beam pulse 20 back into the delay loop 10. Examples of such modifications are disclosed in relation to FIGS. 7 and 8.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The delay loop 10 is intended for formatting laser beams, particularly laser beam pulses, wherever this is required in both experimental and industrial applications. Proper application of the inventive method can produce complex waveforms having a great variety of variable characteristics. For example, if the requirement were merely to produce a pulse of greater duration than that originally emitted from the laser source 34, essentially any of the many possible variations of the invention might be employed, including a single delay loop 10, as described in relation to FIG. 1, herein, provided that the resultant irregular stretched waveform 46 (FIG. 3) was acceptable. At the other extreme, if a nearly flat output were required, a complex array, such as those disclosed in relation to FIGS. 7 and 8, could provide that sort of output, particularly if the delay loop lengths 24 (FIG. 1) were varied among the delay loops 10 such that numerous out-of-phase partial waves were produced.

It is anticipated, further, that many applications will require a relatively precise configuration of wave forms. As just one example, it may be desired to create a peak within the complex waveform 72 (FIG. 5) which will begin a timing sequence within a receiving device.

The inventors have noted that, when the laser beam pulse 20 is of a high average power, the beam splitter 12 will get hot, causing its surfaces to bulge and its index of refraction to vary over the footprint of the laser beam pulse 20. This tends to cause different orders of reflection to have different wavefront distortions which, in turn, causes beam quality to decrease as the number of delay loops is increased. This can be corrected, to at least an acceptable degree, by first causing all orders of reflection from the delay loop 10 to have an identical wavefront distortion. This is done by putting the mirrored side 22 of the beam splitter toward the delay loop 10 (as in the example of the best presently known embodiment of the invention) and by constructing one of the mirrors 14 within the delay loop 10 with a deformation of the same shape as the bulge (caused by the heat) in the reflective surface 22 of the heated beam splitter 12. Since this will cause all of the wavefront distortion to be common to all orders of reflection, the distortion can then be removed by an appropriately deformed mirror outside the delay loop 10. By this modification to the method, the inventive method is readily applicable for use with high average power laser beam pulses 20.

The delay loops 10 may be utilized wherever it is desired to reformat a laser beam pulse. Therefore, it is expected that they will be acceptable in the field as a substitute for conventional means for elongating laser pulses, and that new applications will be developed based upon the new ability to more precisely reformat laser beam pulses which is provided by the present invention. For these and other reasons, it is expected that the utility and industrial applicability of the invention will be both significant in scope and long-lasting in duration.

What is claimed is:

1. A delay loop for formatting a laser pulse, comprising:
   at least one beam splitter having a partially reflective surface thereon with the partially reflective surface facing the interior of the delay loop; and
   a plurality of mirrors arranged such that the laser pulse entering the delay loop through said beam splitter is directed through the delay loop and back to said beam splitter and further such that the laser pulse is repeatedly reflected back form the partially reflective surface of said beam splitter into the delay loop and recirculated through the delay loop back to said beam splitter with progressively smaller portions of the laser pulse being emitted form the delay loop each time the laser pulse strikes the partially reflective surface of said beam splitter.

2. The delay loop of claim 1, wherein:
   the delay loop is formed generally in the shape of a rectangle, with said beam splitter and three of the mirrors forming the four corners thereof.

3. The delay loop of claim 1, wherein:
   the partially reflective surface is constructed to allow approximately one half of the energy of the laser pulse directed thereonto to pass therethrough and, further, to reflect approximately one half of the energy of the laser pulse therefrom.

4. The delay loop of claim 3, wherein:
   a series of sub-pulses is produced by the delay loop, one of the sub-pulses being emitted from the delay loop each time the laser pulse strikes said beam splitter, the sub pulses being those portions of the laser pulse which passes through said beam splitter when the laser pulse is directed onto said beam splitter.

5. The delay loop of claim 4, wherein:

the sub-pulses are even spaced in time at a time interval determined by a delay loop length of the delay loop, the delay loop length being the total distance which the laser pulse travels within the delay loop during each circuit of the delay loop.

6. A method for elongating a laser beam pulse, comprising:

inputting an input beam pulse into a delay loop, said input beam pulse having a first length;

causing said input beam pulse to be circulated within said delay loop, said delay loop including a beam splitter and redirection means for redirecting said input beam pulse back toward said beam splitter;

emitting a portion of said input beam pulse to produce an output pulse, said output pulse having a second length greater than said first length.

7. The method of claim 6, wherein:

the redirection means includes at least one highly reflective mirror.

8. The method of claim 6, wherein:

the redirection means includes at least one additional beam splitter.

9. The method of claim 6, wherein:

the beam splitter has a partially mirrored surface positioned such that the laser beam pulse, having been directed toward the beam splitter by the redirection means, is reflected by the partially mirrored surface again toward the redirection means, with a portion of the energy of the laser beam pulse passing through the beam splitter and being emitted from the delay loop.

10. The method of claim 9, wherein:

a plurality of the delay loops is arranged such that the laser beam pulse circulates through all of the plurality of the delay loops.

11. The method of claim 10, wherein:

the delay loops of the plurality of delay loops are arranged such that the laser beam pulse travels sequentially though the delay loops.

12. The method of claim 10, wherein:

at least two of the delay loops have a common beam splitter, such that the laser beam pulse is allowed to enter another of the delay loops through the common beam splitter.

13. The method of claim 10, wherein:

the reflectivity of the partially mirrored surface and the length of a path which the laser beam pulse must travel within the delay loop is controlled in each of the delay loops of the plurality of delay loops to create a desired complex wave shape.

14. An array of delay loops for formatting a laser pulse comprising a plurality of delay loops arranged such that an input beam pulse circulates within each of said delay loops, said input beam pulse having a first length; redirecting means for redirecting said input beam pulse to a beam splitter within each of said delay loops; and means for emitting a portion of said input beam pulse to produce an output pulse having a second length greater than said first length.

15. The array of claim 14, wherein each of said delay loops produces a series of sub-pulses, thereby formatting said input beam pulse into a complex wave form.

16. The array of claim 14, wherein said delay loops are arranged such that the sub-pulses emitted from a first delay loop are directed into a second delay loop.

17. The array of claim 14, wherein each of said sub-pulses emitted has a length greater than said input beam pulse.

18. The array of claim 14, wherein at least one beam splitter has a partially reflective surface thereon which faces the interior of one of said delay loops; and a plurality of mirrors arranged such that the input beam pulse entering said delay loop through said beam splitter is directed through said delay loop and back to said beam splitter;

said input beam pulse being repeatedly reflected back from said beam splitter into said delay loop and recirculated through said delay loop back to said beam splitter, wherein progressively smaller portions of said input beam pulse is emitted from said delay loop each time said input beam pulse strikes said beam splitter.

* * * * *